United States Patent Office 2,711,424
Patented June 21, 1955

2,711,424
NEW ETHERS OF SYMMETRICAL TRIHALOGENATED PHENOLS

Hans Suter, Ct. Schaffhausen, and Hans Zutter, Schaffhausen, Switzerland, assignors to Cilag Limited, Schaffhausen, Switzerland, a Swiss company No Drawing. Application November 7, 1951, Serial No. 255,316

Claims priority, application Switzerland November 13, 1950

4 Claims. (Cl. 260—520)

This invention relates to new ethers of symmetrical trihalogenated phenols of the general formula

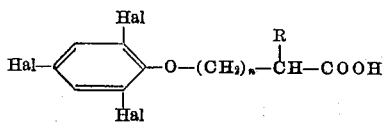

wherein "Hal" represents iodine or bromine atoms, $n$ represents the numbers 0, 1, 2 and 3 and wherein R is an aryl, aralkyl, cycloalkyl or cycloalkenyl group.

We have found that these compounds are effective as contrast agents in roentgenological examinations of the bile and the bile-duct, partly also for the roentgenological examinations of the urogenital system. They are marked by their low toxicity as well as their clear delineation. These compounds may be used orally in the free acid form or intravenously in the form of their salts prepared from organic bases, f. i. morpholine, diethanolamine, monoethanolamine and dialkylamines, with practically neutral reaction and very easily soluble in water.

Compounds which contain the iodine-containing parts ether-like linked to the remaining framing which contains the carboxyl group have, except the case described hereinafter, up to now not been described as X-ray contrast agents. Some time ago mono- and bis(2,4,6-triiodophenoxy)acetic acids have been proposed as X-ray contrast medias by T. C. Daniels et al. [J. Am. Chem. Soc. 58, p. 2646 (1936)]. But, according to our own experiments, if used orally these compounds do not delineate the gall-bladder and furthermore are too toxic.

All the more it was surprising to find that with the compounds described herein, firstly very good delineations can be obtained and secondly no toxic side reactions have occurred.

U. S. Patent 2,503,296 describes X-ray contrast agents of the formula

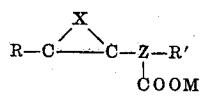

wherein R represents an iodinated hydroxyphenyl group, R' is an aryl radical, f. i. a phenyl or naphthaline radical, Z represents an oxygen or sulphur atom, and wherein X represents hydrogen atoms or a C—C double bond. These compounds contain the iodinated part as well as the carboxyl group in the same framing, whilst an aryl group is separated thereof by an ether bridge. The substances of this formula are closely referring to the well known α-phenyl-β-(4'-hydroxy 3',5'-diiodophenyl)-propionic acid. All these compounds contain the well known part "4-hydroxy-3,5-diiodophenyl" mutually which is considered to be necessary in an X-ray contrast agent in order to get a good absorption in the gall or which can only be replaced by the group

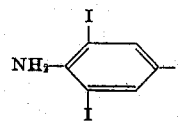

[Domenik Papa et al. J. Am. Chem. Soc. 72, p. 4906 1950)].

With regard to the results published by Papa (loc. cit) it was therefore also very surprising that compounds which contain the halogen atoms in quite different an arrangement than usual should produce just so effective gall shadows.

On the whole one is able to produce the substances in question by reacting a compound of the formula

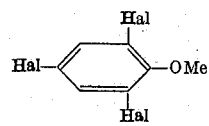

wherein Me represents a monovalent metal atom, f. i. an alkali atom, with a compound of the formula

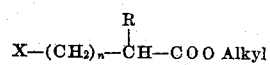

wherein X represents a halogen atom and R has the mentioned significance and splitting off hydrolytically the alkyl rest "alkyl" of the reaction product. The reaction is preferably carried out in a lower alkanol. The hydrolytical splitting of the alkyl rest "alkyl" may occur in an acid or alkaline solution. Generally the use of an alkali hydroxide in alcoholic solution is very advantageous.

Compounds in which $n$ is larger than 1 may also be obtained by the following procedure:

A compound of the formula

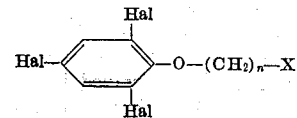

wherein $n$ is larger than 1 and X means a halogen atom, is reacted with a compound of the formula

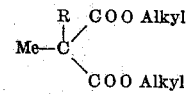

wherein Me represents an alkali atom, whereupon the obtained product of the formula

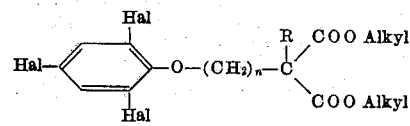

is saponified to a substance of the formula

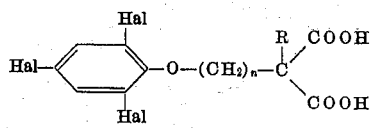

which substance is heated until the splitting of one of the carboxyl groups has occurred.

In general and if desired the compounds may be isolated as salts of organic and inorganic harmless bases.

Example 1

5.8 gms. of sodium are dissolved in 400 cc. of abs. ethanol and 118 gms. of 2,4,6-triiodophenol are added to this solution. The whole is heated on the steam bath until a clear solution is obtained, whereupon within 30 minutes 49.6 gms. of α-chloro-phenyl acetic acid ethyl ester is added drop by drop under good turbination. By crystalline separation of sodium chloride the solution soon is getting milky. It is boiled for 15 hours under stirring, afterwards cooled to 40° and the crystalline mass sucked off. The latter is recrystallised from ethanol. In this way 110 gms., i. e. 70% of the theory, of α-(2,4,6-triiodiphenoxy)-phenyl acetic acid ethyl ester are obtained. The new ether forms fine white needles which melt at 91–92° and which are easily soluble in hot ethanol, hot petroleum ether, hardly soluble in water and cold ethanol.

Analysis: $C_{16}H_{13}O_3I_3$; 633.86
I calc.: 60.07%
I found: 60.30%

Example 2

60 gms. of sodium hydroxide are dissolved in 600 cc. of 50% ethanol and 77 gms. of α-(2,4,6-triiodophenoxy) phenyl acetic acid ethyl ester are added. The whole is boiled for 2 hours under reflux, during which time a clear yellowish solution is obtained. Then it is evaporated under vacuum until milkiness is starting and acidified with conc. hydrochloric acid. A yellow oil is separating which after a certain time solidifies to crystals. One sucks off, washes with water and dissolves the crystalline mass in a diluted solution of sodium carbonate. After filtration it is again precipitated with hydrochloric acid. Instead of this kind of purification it is also possible to recrystallise from ethanol. An average of 50–60 gms. i. e. 70–80% of the theory, of α-(2,4,6-triiodiphenoxy)phenyl acetic acid are obtained which form colourless cubes melting at 172–173° under decomposition.

The new acid forms a sodium salt which is soluble in water. Against that salts with morpholine and diethanolamine are soluble in water over 30%.

Analysis: $C_{14}H_9O_3I_3$; equivalent weight
I calc.: 62.74%; calc.: 606.8
I found: 63.00%; found: 607.5

Example 3

23 gms. of sodium are dissolved in 2500 cc. of abs. ethanol and 331 gms. of 2,4,6-tribromophenol are added to the solution. It is heated on the steam bath with stirring. As soon as the solution has become clear, 200 gms. of α-chloro phenyl acetic acid ethyl ester are added drop by drop and with stirring within one hour. Afterwards it is boiled for 18 hours under reflux and the formed sodium chloride is sucked off as long as hot and then cooled. The separated crystals are collected, washed with ice-cooled ethanol and recrystallised from ethanol. In this way 300 gms., i. e. 30% of the theory, of α-(2,4,6-tribromophenoxy)-phenyl acetic acid ethyl ester are obtained. The new ether forms colourless needles, melting at 78.5–79° which are little soluble in water and cold ethanol, easily soluble in ether, dioxane, benzol and chloroform.

Analysis: $C_{16}H_{23}O_3Br_3$; 493.012
Br. calc.: 48.63%
Br. found: 48.79%

Example 4

84 gms. of a solution of potash are dissolved in 600 cc. of 50% ethanol, 100 gms. of α-(2,4,6-tribromophenoxy)-phenyl acetic acid ethyl ester are added and the whole is heated to boiling for 3 hours. Then it is evaporated until milkiness starts, acidified with conc. hydrochloric acid and cooled. The crystalline mass obtained is drawn off, washed with ice-cooled 50% ethanol and recrystallised from ethanol. In this way 51 g. of α-(2,4,6-tribromophenoxy)-phenyl acetic acid are obtained, i. e. a yield of 54% of the theory. The new acid forms a colourless crystalline powder that melts at 178.5–179.5 and which is hardly soluble in water and petroleum ether, but easily soluble in ether, warm ethanol, acetone, benzol, dioxane and chloroform. Salts with diethanolamine and morpholine are easily soluble in water; sodium and diethylamine salts are less readily soluble.

Analysis: $C_{14}H_9O_3Br_3$: 464.96; equivalent weight
Brom. calc.: 51.56%; calc.: 464
Brom found: 51.40%; found: 461.8; 465

Example 5

4.6 gms. of sodium are dissolved in 350 cc. of abs. ethanol. 94 gms. of 2,4,6-triiodophenol are added and the whole is heated with stirring until everything has dissolved. Then under continuous stirring 50 gms. of α-bromocyclohexyl acetic acid ethyl ester are added and it is boiled for 30 hours. By filtration the cooled solution is freed from the separated sodium bromide and concentrated to the half. The crystalline mass is recrystallised from ethanol. In this way α-(2,4,6-triiodophenoxy)-cyclohexyl acetic acid ethyl ester is obtained in fine, colourless needles, which melts at 86–87°. The new compound is very little soluble in water, hardly soluble in methanol and ethanol, but easily soluble in chloroform, dioxane and acetone.

Analysis: $C_{16}H_{19}O_3I_3$; 640.072
I calc.: 59.48%
I found: 60.12%, 59.79%

Example 6

12 gms. of a solution of potash are dissolved in 100 cc. of 50% ethanol and 64 gms. of α-(2,4,6-triiodophenoxy)-cyclohexyl acetic acid ethyl ester are added. The whole is heated with stirring to 90° for 4 hours and then evaporated to the half. The mixture is put to pH: 1 with hydrochloric and the obtained oily product is decanted. By stirring with a little of 50% ethanol this oil solidifies. The solid mass is crystallised from ethanol by adding a little water. In this way 45 gms. of α-(2,4,6-triiodophenoxy)-cyclohexyl acetic acid are obtained which melt at 192–193°. The new acid is forming colourless leaflets which are very readily soluble in water and cold ethanol. The salt of morpholine, ethanolamine and diethanolamine of this acid is easily soluble in cold water.

Analyses: $C_{14}H_{15}O_3I_3$; 612.02; equivalent weight
I calc.: 62.22%; calc.: 612
I found: 62.45%; found: 614,611

Example 7

12 gms. of sodium are dissolved in 800 cc. of abs. ethanol to which solution 236 gms. of 2,4,6-triiodophenol are added. It is heated with stirring on the water bath until a clear solution is obtained whereupon within 2 hours 130 gms. of α-phenyl-γ-bromo butyric acid ethyl ester are added in drops. By the same procedure described in the former examples γ-(2,4,6-triiodophenoxy)-α-phenyl butyric acid ethyl ester is obtained in colourless crystals, melting at 80–81°. Hydrolysed as described in the former examples, γ-(2,4,6-triiodophenoxy)-α-phenyl butyric acid is obtained which melts at 165–167°. The salts thereof are of similar solubilities as those of the acids formerly described.

In a similar manner are obtained:
From α-phenyl-β-bromo propionic acid ethyl ester and 2,4,6-triiodophenol-sodium followed by alkaline saponification of the reaction product, the α-phenyl-β-(2,4,6-triiodophenoxy)-propionic acid.

From α-bromo-α-(Δ$_{1,2}$-cyclohexenyl)acetic acid ethyl ester and 2,4,6-triiodophenol-sodium followed by alkaline saponification of the reaction product, the α-(2,4,6-triiodophenoxy)-α-(Δ$_{1,2}$-cyclohexenyl)-acetic acid.

What we claim is:
1. The new chemical compound of the formula

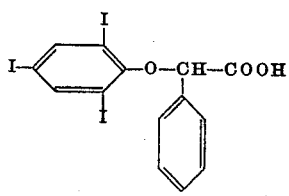

2. The new chemical compound of the formula

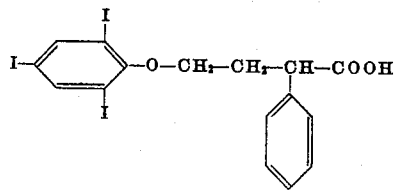

3. The new chemical compound of the formula

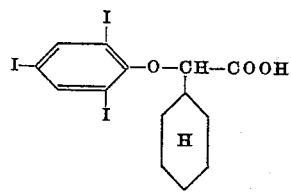

4. New chemical compounds of the group consisting of free acids of the general formula

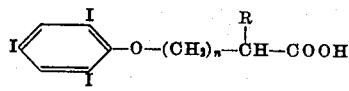

salts thereof with organic bases, and salts thereof with inorganic bases, whereby in the formula R stands for a substituent of the group consisting of phenyl, cyclohexyl and cyclohexenyl, and $n$ represents a member of the group consisting of 0, 1 and 2.

References Cited in the file of this patent

UNITED STATES PATENTS

| | | |
|---|---|---|
| 2,345,384 | Dohrn et al. | Mar. 28, 1944 |
| 2,428,978 | Martin et al. | Oct. 14, 1947 |
| 2,449,991 | Gresham et al. | Sept. 28, 1948 |
| 2,503,296 | Papa et al. | Apr. 11, 1950 |
| 2,509,772 | Leaper | May 30, 1950 |

OTHER REFERENCES

Newman et al. Chemical Abstracts, vol. 41 (1947) pgs. 3902–3912.

Newman et al. J. Am. Chem. Soc. vol. 69 (1947) pgs. 718–723.

Chem. Abstracts, Index to vol. 44, col. 1, page 11764 (1950).

Nametkin et al., Chem. Abstracts, vol. 44, col. 4374 (1950).